United States Patent [19]
Greenhill

[11] 3,786,470
[45] Jan. 15, 1974

[54] SENSING AND CONTROL SYSTEM
[76] Inventor: Derek Howard Greenhill, Arthur St., Redditch, England
[22] Filed: July 25, 1972
[21] Appl. No.: 274,867

[52] U.S. Cl............. 340/267 R, 226/100, 340/282
[51] Int. Cl. .......................................... G08b 21/00
[58] Field of Search............ 340/267 R, 282, 213 Q; 226/100; 200/61.13, 61.41

[56] References Cited
UNITED STATES PATENTS
2,076,236   4/1937   Holloway........................... 226/100

*Primary Examiner*—Donald J. Yusko
*Assistant Examiner*—Glen R. Swann, III
*Attorney*—Marshall & Yeasting

[57] ABSTRACT

A sensing and control system for controlling operation of a machine comprises a timer which is arranged to modify the action of the machine after the elapse of a preset time interval from the occurrence of a first given operating condition of the machine if a second given operating condition does not occur within the interval timed. If the second condition occurs within the interval timed the modifying action of the timer is disabled.

6 Claims, 3 Drawing Figures

SENSING AND CONTROL SYSTEM

BACKGROUND OF THE INVENTION

This invention relates to a sensing and control system for use in controlling the operation of a machine in which a succession of operations (or repetition of the same operation) is carried out each within a predetermined time period and it is desired to modify operation of the machine, including stopping the machine or at least its feed mechanism and possibly provide audible and/or visual warning, if any operation (or series thereof) is not carried out within the time allotted for it. The invention is particularly applicable to spring coiling machines in which a continuous length of coil spring is formed from wire and severed at predetermined intervals. It may however have other applications, as for example to wire forming or straightening machines.

In machines such as spring coiling machines in which successive predetermined lengths of material are severed from a continuous length, a number of faults can occur which can lead to great incovenience and possibly damage to the machine if the latter is allowed to continue in faulty condition. Examples of such faults are (a) wire breakage, (b) exhaustion of wire supply, (c) failure of wire feed and (d) failure of the cutting mechanism.

An object of the invention is to provide a sensing and control system for use with machines of the above kind whereby such faults as well as the severing of incorrect lengths of material are sensed and the machine, or a part of its mechanism, is automatically stopped or its performance otherwise modified in response to sensing of a fault.

SUMMARY OF THE INVENTION

In its broadest aspect the invention resides in a sensing and control system for controlling the operation of a machine comprising a timer arranged to actuate means to modify the action of the machine after the elapse of a predetermined time period from the occurrence of a first given operating condition of the machine if a second given operating condition of the machine does not occur before said time period elapses, and including sensing means for detecting the occurrence of said second operating condition and preventing actuation of said means by the timer when said second condition is detected during said predetermined time period.

More specifically, the invention resides in a sensing and control system for controlling the operation of a machine comprising first and second timers arranged to actuate means for modifying the action of the machine, the first timer being arranged to actuate said means after the elapse of a first predetermined time period from the occurrence of a first given operating condition of the machine if a second given operating condition of the machine does not occur before said first time period elapses, and the second timer being arranged to actuate said means after the elapse of a second predetermined time period from the occurrence of said second given operating condition if a third given operating condition of the machine does not occur before said second time period elapses, and sensing means for detecting the occurrence of said second and third operating conditions and preventing actuation of said means by the first timer when said second condition occurs within said first predetermined time period and by the second timer when said third condition occurs within said second predetermined time period.

It will be understood that the expression "the occurrence of a given operating condition" includes the failure of the machine to attain a particular operating condition or to perform an operation as well as the obtaining of an operating condition or completion of an operation.

In a convenient arrangement, particularly applicable to a spring coiling machine, two electrically operated timers are provided, one being arranged for actuation by contact with a sensing element with the end of a workpiece (in this case a coil spring) fed by the machine and to modify operation of the machine if such contact is maintained for longer than a predetermined period, the other being arranged to modify operation of the machine if no contact is made with the sensing means after a predetermined period has elasped. The timers may conveniently be arranged to interrupt the machine feed at the end of said predetermined periods. Operation of the timers is effected through an electrical circuit completed by said contact of the sensing element and formed spring.

Thus, one timer guards against occurrence of faults (a) to (c) and the other against fault (d). The timers also guard against excessively long or short springs being formed.

A similar arrangement may be applied to other kinds of machines in which lengths of material are severed in succession from a continuous length, such as wire forming and straightening machines.

DESCRIPTION OF THE PREFERRED EMBODIMENTS

Figure 3:
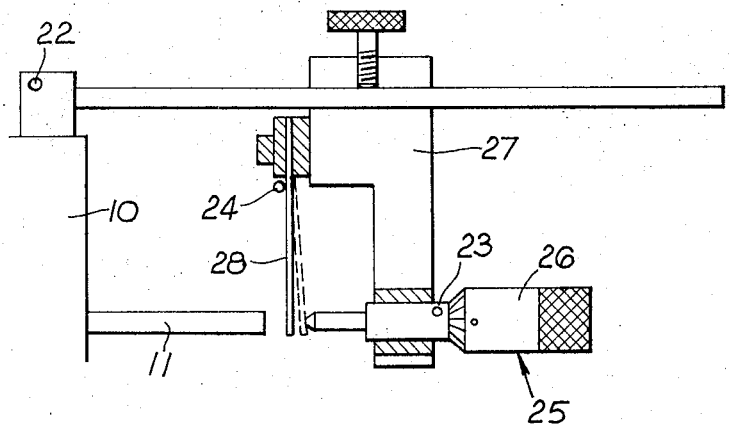
FIG. 3 is a diagrammatic view of part of a machine incorporating the system of either FIG. 1 or FIG. 2.

Referring to FIG. 3, a machine, for example, a conventional helical spring coiling machine, designated generally by reference numeral 10 continuously feeds a continuous length of a workpiece 11, such as a coil spring or wire, past an unshown severing device, where discrete lengths are severed by the severing mechanism after the normal time taken for feeding a predetermined length of workpiece has expired. The circuit of FIG. 1, or FIG. 2, controls feeding of the workpiece 11.

Figure 2:
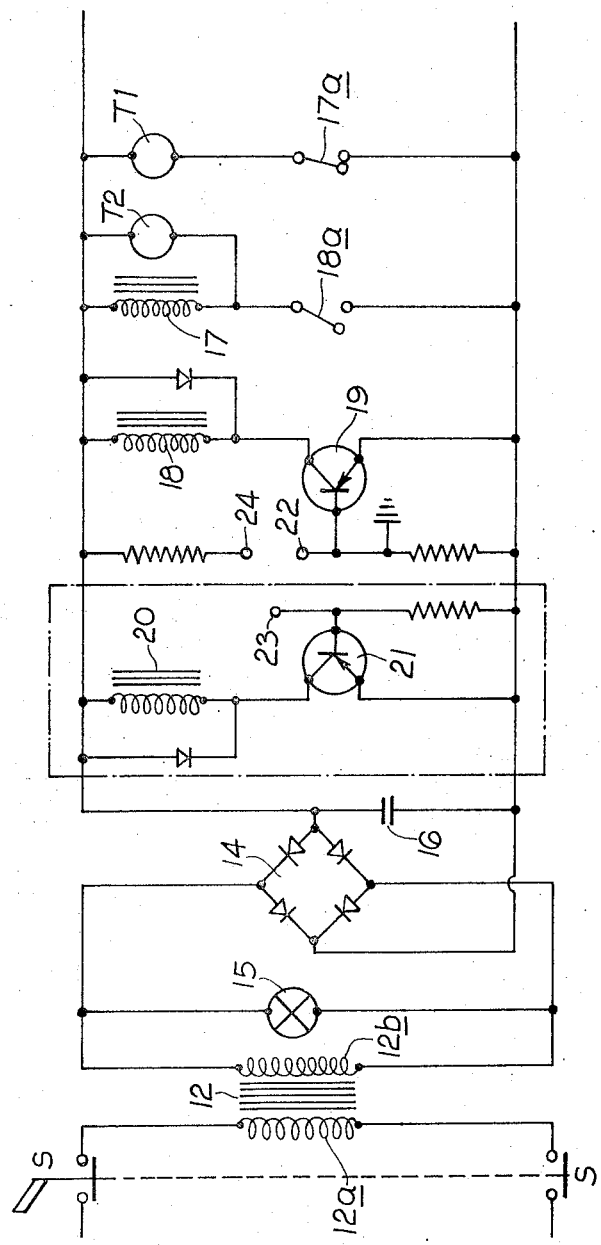
FIG. 2 is a circuit diagram of a modified form of the sensing and control system of FIG. 1.

The circuit of FIG. 2 incorporates a power pack comprising a transformer 12, the primary 12a of which is connected to a 400/240 volt supply through a ganged switch S and the secondary 12b of which is connected to a diode bridge rectifier 14. Numeral 15 depicts a "power on" indicator lamp connected across the secondary 12b. The rectified supply is smoothed by a capacitor 16.

The circuit also includes a pair of timers T1 and T2, the timer T1 being connected across the low tension side (conveniently 12 volts) of the power supply through a normally closed contact 17a of a relay 17 connected in parallel with timer T2 and in series with a normally open switch 18a of a relay 18. The relay 18 is connected to the collector of a transistor 19. The circuit of FIG. 2 additionally incorporates a further relay 20 connected to the collector of a transistor 21.

The machine carries three electrical contacts 22, 23 and 24. The contact 22 is carried by the main body of the machine whilst the contact 23 is carried by the spindle of a micrometer, the barrel 26 of which is insulated electrically. The micrometer 25 is mounted by a member 27 which is adjustable axially of the direction of feed movement of the workpiece 11, the spindle of micrometer 25 being co-axial with said direction of feed movement. The member 27 also mounts a resilient blade 28 which projects into the path of feed movement of the workpiece 11 and the contact 24 is secured to the blade 28.

Figure 1:
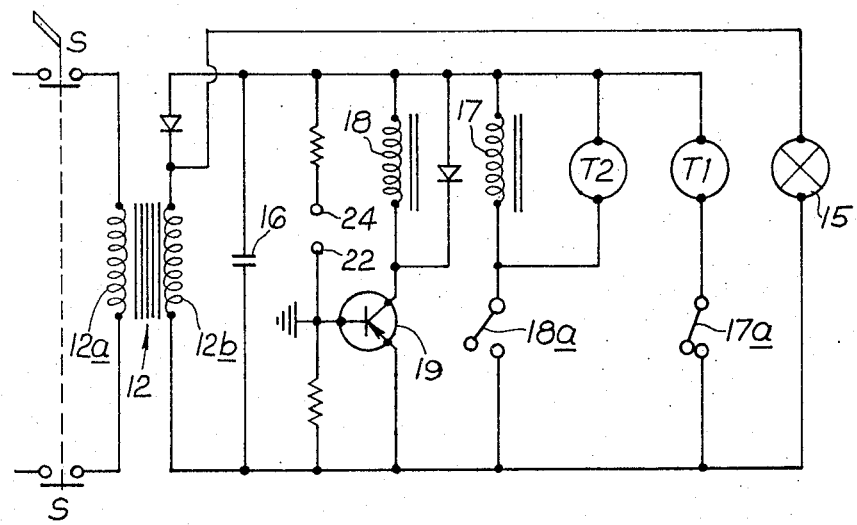
FIG. 1 is a circuit diagram of a sensing and control system according to the invention.

When the blade 28 contacts the workpiece 11, electrical continuity is established between contacts 22 and 24 and, referring to FIGS. 1 and 2, the transistor 19 conducts in response to such contact. Similarly, when the blade 28 contacts the tip of the spindle of the micrometer 25, electrical continuity is established between contacts 24 and 23 and transistor 21 of FIG. 2 conducts when this circuit is used instead of that of FIG. 1.

Feed movement of the workpiece 11 occurs in response to closing of the switch S and simultaneously timer T1 begins its timing cycle the period of which is selected so as to be slightly in excess of the normal time required for a predetermined length of workpiece 11 to be fed towards the blade 28. When the normal time for feeding said predetermined length of workpiece towards the blade 28 expires the severing mechanism of the machine is rendered operative to sever the length of workpiece fed. The position of the blade 28, which may be adjusted by adjusting the position of member 27, is set in accordance with the predetermined length of workpiece 11 to be fed by the machine. As the tip of the workpiece 11 contacts blade 28, electrical continuity is established between contacts 22 and 24 causing transistor 19 to conduct. Relay 18 is thus energised to close its associated contact 18a and energise relay 17. Normally closed contact 17a opens and timing by timer T1 is terminated and the timer T1 then automatically re-sets to its zero state. Timer T2 starts to time as soon as contact 18a closes and is set to time out after a period just later than the normal time required for the severing mechanism to sever the length of workpiece fed. When the spring has been severed, it falls away from the blade 28 and the circuit across terminals 22 and 24 is broken and consequently relay contact 18a opens to stop timer T2 when automatically re-sets to its zero state.

Timers T1 and T2 are associated with internal contacts of the machine which operate, in response to timing out of each timer, to interrupt the supply of power to the machine feed motor for example, or otherwise to stop the feed, and possibly also to actuate an audible or visual alarm. thus, if the workpiece fed towards blade 28 does not make contact therewith before timer T1 times out, the feed movement will be interrupted by closure of said internal contacts. If however contact between blade 28 and the workpiece is made within the period timed by timer T1, timer T2 is rendered operative and will cause closure of said internal contacts of the machine if the severed length of workpiece does not fall away from the blade 28 within the period the timer T2 is set to time.

Thus, the circuit of FIG. 1 guards against the occurrence of certain faults such as (a) breakage of the workpiece, (b) exhaustion of the workpiece supply, (c) failure of workpiece feed and (d) failure of the severing mechanism. Timer T1 guards against faults (a) to (c) whilst timer T2 guards against fault (d).

An additional safeguard against failure, or retarded operation of the severing mechanism is provided by the circuit of FIG. 2. When the length of workpiece 11 contacts the blade 28, in order to maintain continuous operation of the machine, the feed movement is not terminated and consequently the feed movement continues whilst the severing mechanism is, or should be, operative. In the normal course of events, the severing mechanism is actuated immediately in response to expiration of the normal time required to feed a predetermined length of the workpiece 11 and conseqeuntly no substantial flexing of the blade 28 occurs if the workpiece fed is of the predetermined length. However, if operation of the severing mechanism is retarded or malfunctions or if the length of workpiece fed exceeds said predetermined length, the blade 28 will be flexed in a direction towards the spindle of the micrometer 25. By setting the axial spacing between the unflexed blade 28 and the tip of the spindle of the micrometer 25, an upper limit can be set to the length of severed workpiece that is acceptable and if circumstances arise in which this upper limit tends to be exceeded, for example unduly retarded operation of the severing mechanism or excessive feed of the workpiece, the blade 28 will be flexed by the workpiece into contact with the spindle of the micrometer thereby establishing electrical continuity between contacts 23 and 24. Such contact will energise relay 20 which may be arranged to close said internal contacts of the machine and thereby terminate feed movement and/or actuate an alarm and additionally open contact 18a to stop operation of timer T2.

Thus, the spacing between the blade 28, in its unflexed position and the initial feed point of the leading end of the workpiece upon closure of switch S or after a previous severing operation, determines the minimum acceptable length of workpiece severed by the machine whilst the spacing between said initial feed point and the tip of the spindle of micrometer 25 determines the maximum acceptable length of workpiece that may be severed by the machine.

As described, the timer T1 is set to time out just after the normal time for feeding a predetermined length of workpiece expires and if the length fed in this normal time is not sufficient to contact blade 28, a short length is severed and the machine feed is stopped.

However, the timer T1 may be set to time out in a period such that two or more short lengths may be severed before it operates to close the internal contacts of the machine. In this way, transient malfunctioning of the machine is ignored by timer T1 and only systematic malfunctioning leads to stopping of the feed movement. Thus, if the machine operates satisfactorily for most of the time and only periodically produces a short length of workpiece, the feed movement is uninterrupted. Only when the machine successively severs two or more short lengths is the timer T1 effective to stop the machine feed.

I claim:

1. A sensing and control system for controlling the operation of a machine comprising first and second timers arranged to actuate means for modifying the action of the machine, the first timer being arranged to actuate said means after the elapse of a first predetermined time period from the occurrence of a first given operating condition of the machine if a second given operating condition of the machine does not occur before said first time period elapses, and the second timer being arranged to actuate said means after the elapse of a second predetermined timer period from the occurrence of said second given operating condition if a third given operating condition of the machine does not occur before said second time period elapses, and sensing means for detecting the occurrence of said second and third operating conditions and preventing actuation of said means by the first timer when said second condition occurs within said first predetermined time period and by the second timer when said third condition occurs within said second predetermined time period.

2. A system according to claim 1 wherein the first timer is arranged to start timing in response to initiation of feeding movement of a workpiece by the machine and timing by the first timer is arrested in response to contact of said workpiece with a sensing element of the sensing means.

3. A system according to claim 1 wherein the second timer is arranged to start timing in response to contact of a workpiece fed by the machine with a sensing element of the sensing means and timing by the second timer is arrested in response to disengagement of said workpiece from said sensing element.

4. A system according to claim 1 wherein said machine includes means for feeding a workpiece through a predetermined distance within said first predetermined time period and means for performing an operation of said workpiece on completion of feeding thereof through said predetermined distance, completion of feeding of said workpiece through said predetermined distance constituting said second given operating condition of the machine, said system further including further sensing means for sensing feed movement of said workpiece in excess of said predetermined distance by a pre-selected amount and actuating said modifying means in response to sensing of said excess feed movement.

5. A system according to claim 1 wherein the modifying means actuated by each timer interrupts the machine feed at the end of the period at which the timer is set to time.

6. A sensing and control system for controlling the operation of a machine comprising a timer arranged to actuate means to modify the action of the machine after the elapse of a predetermined time period from the occurrence of a first given operating condition of the machine if a second given operating condition of the machine does not occur before said time period elapses, including sensing means for detecting the occurrence of said second operating condition and preventing actuation of said modifying means by the timer when said second condition is detected during said predetermined time period, said machine including means for feeding a workpiece through a predetermined distance within said predetermined time period, completion of feeding of said workpiece through said predetermined distance constituting said second given operating condition of the machine, said system further including sensing means for sensing feed movement of said workpiece in excess of said predetermined distance by a pre-selected amount and actuating said modifying means in response to sensing of said excess movement.

* * * * *